US005267065A

United States Patent [19]

Taniguchi et al.

[11] Patent Number: 5,267,065

[45] Date of Patent: Nov. 30, 1993

[54] LIQUID CRYSTAL APPARATUS

[75] Inventors: Osamu Taniguchi, Chigasaki; Akira Tsuboyama, Sagamihara; Yutaka Inaba, Kawaguchi; Kazunori Katakura, Atsugi; Tadashi Mihara, Isehara; Mitsuo Iwayama, Odawara; Yoshio Hotta, Atsugi, all of Japan

[73] Assignee: Canon Kabushiki Kaisha, Tokyo, Japan

[21] Appl. No.: 814,436

[22] Filed: Dec. 30, 1991

Related U.S. Application Data

[63] Continuation-in-part of Ser. No. 790,078, Nov. 13, 1991, abandoned, which is a continuation of Ser. No. 512,259, Apr. 20, 1990, abandoned.

[30] Foreign Application Priority Data

| | | | |
|---|---|---|---|
| Apr. 24, 1989 | [JP] | Japan | 1-101733 |
| Jun. 18, 1991 | [JP] | Japan | 3-145996 |

[51] Int. Cl.[5] ..................... G02F 1/93

[52] U.S. Cl. ..................... 359/56; 359/54; 345/97

[58] Field of Search ..................... 359/54, 56; 340/784, 340/765, 805

[56] References Cited

U.S. PATENT DOCUMENTS

| | | | |
|---|---|---|---|
| 4,932,759 | 6/1990 | Toyono et al. | 359/56 |
| 4,938,574 | 7/1990 | Kaneko et al. | 359/56 |
| 5,117,298 | 5/1992 | Hirai | 340/784 |

*Primary Examiner*—Donald T. Hajec
*Assistant Examiner*—Tan Ho
*Attorney, Agent, or Firm*—Fitzpatrick, Cella, Harper & Scinto

[57] ABSTRACT

A liquid crystal apparatus includes: a ferroelectric liquid crystal device comprising an electrode matrix including a plurality of scanning lines and a plurality of data lines intersecting with the scanning lines, and a ferroelectric liquid crystal disposed between the scanning lines and data lines, and a driver for sequentially applying a scanning signal to the scanning lines for selecting a particular scanning line, and for applying data signals for the pixels on the selected scanning line to the data lines. Each of the data signals has a plurality of pulses including a pulse in a controlled phase and a pulse in an auxiliary phase, and the scanning signal for the selected scanning line has a compensation pulse for compensating the pulse in the auxiliary phase of a data signal for a pixel on the selected scanning line.

32 Claims, 10 Drawing Sheets

LIQUID CRYSTAL APPARATUS

CROSS-REFERENCE TO RELATED APPLICATIONS

This application is a continuation-in-part of U.S. Pat. application Ser. No. 790,078, filed Nov. 13, 1991, abandoned, which in turn is a continuation of U.S. Pat. application Ser. No. 512,259, filed Apr. 20, 1990, abandoned.

FIELD OF THE INVENTION AND RELATED ART

The present invention relates to a liquid crystal apparatus including a ferroelectric liquid crystal device and a multiplexing drive means.

In recent years, the use of a bistable liquid crystal device has been proposed as an improvement to the conventional TN-liquid crystal device by Clark and Lagerwall (U.S. Pat. No. 4,367,924, etc.). As the bistable liquid crystal, a ferroelectric liquid crystal having a chiral smectic C phase (SmC*) or H phase (SmH*) is generally used. The liquid crystal shows bistable states including a first and a second optically stable state in response to an electric field, so that the liquid crystal is oriented to, e.g., the first optically stable state in response to one electric field vector and to the second optically stable state in response to the other electric field vector. Further, the liquid crystal very quickly responds to an applied electric field to be oriented to either one of the two stable states and retains the resultant state in the absence of an electric field. By utilizing these properties, it is possible to attain a substantial improvement in problems accompanying the use of the conventional TN-type liquid crystal device.

Further, many proposals have been made with respect to a driving method for multiplexing drive of such a bistable ferroelectric liquid crystal device, including those disclosed in U.S. Pat. Nos. 4,655,561, 4,638,310, 4,715,688, 4,701,026, 4,725,129, 4,770,502, and 4,850,676, for example.

However these multiplexing drive methods proposed in the above patents involve the following problems.

(1) The response speed of the liquid crystal per se is faster than that of a conventional TN-liquid crystal, but the frame frequency in matrix drive is low.

(2) The range of voltage value or pulse duration of a drive pulse allowable for matrix drive, i.e., the drive margin, is narrow.

As an improvement with respect to the above problem (1), the above-mentioned U.S. Pat. No. 4,770,502 has proposed a driving method wherein selection terms for scanning lines are overlapped with each other to provide an increased frequency. This method is accompanied with a tendency that the drive margin (2) is further decreased, so that it has been difficult to satisfy a high frame frequency and a wide drive margin in combination by the conventional methods.

SUMMARY OF THE INVENTION

An object of the present invention is to provide a ferroelectric liquid crystal apparatus which satisfies a higher frame frequency in multiplexing drive of a ferroelectric liquid crystal device while retaining a sufficient drive margin.

According to the present invention, there is provided a liquid crystal apparatus, comprising:

a ferroelectric liquid crystal device comprising an electrode matrix including a plurality of scanning lines and a plurality of data lines intersecting with the scanning lines, and a ferroelectric liquid crystal disposed between the scanning lines and data lines, and drive means for sequentially applying a scanning signal to the scanning lines for selecting a particular scanning line, and for applying data signals for the pixels on the selected scanning line to the data lines, wherein each of the data signals has a plurality of pulses including a pulse in a controlled phase and a pulse in an auxiliary phase, and the scanning signal for the selected scanning line has a compensation pulse for compensating the pulse in the auxiliary phase of a data signal for a pixel on the selected scanning line.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
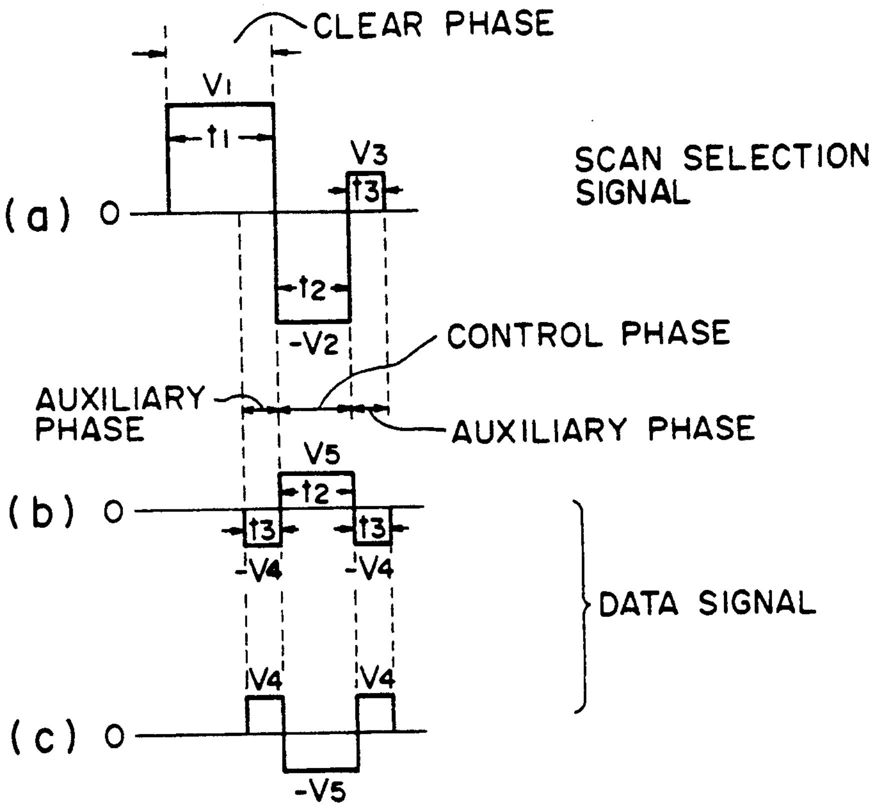
FIG. 1 is a waveform diagram showing a set of driving signal waveforms used in an embodiment of the liquid crystal apparatus according to the present invention.

FIG. 1 shows a set of driving signal waveforms used in an embodiment of the liquid crystal apparatus according to the present invention, in which a selection signal waveform is shown at (a), and data signal waveforms corresponding to "white" and "black" image data are shown at (b) and (c), respectively. Further, a voltage of, e.g., zero (not shown) is applied to scanning lines at the time of non-selection.

Referring to the waveform at FIG. 1(*b*), a phase having a pulse duration $t_2$ and a voltage value $V_5$ is a control phase, and phases having a pulse duration $t_3$ and a voltage value $-V_4$ are auxiliary phases. As described above, by using a data signal having these pulse phases, an image defect, such as flicker at the time of non-selection, can be alleviated. The selection signal waveform at FIG. 1(*a*) comprises a clear or erasing phase having a pulse duration $t_1$ and a voltage value $V_1$, a control phase having a pulse duration $t_2$ and a voltage value $-V_2$, and an auxiliary phase having a pulse duration $t_3$ and a voltage value $V_3$, which is a phase for compensating an auxiliary phase of the data signal. Herein, the voltage $V_3$ is set to satisfy $0<V_3<V_1$ and may preferably satisfy $|V_3|=|V_4|$. The provision of this compensation phase is a characteristic of the present invention, by which the above-mentioned drive margin is remarkably improved.

Further, it is preferred that all the pixels on a selected scanning line are simultaneously cleared into a black state.

Figure 3:
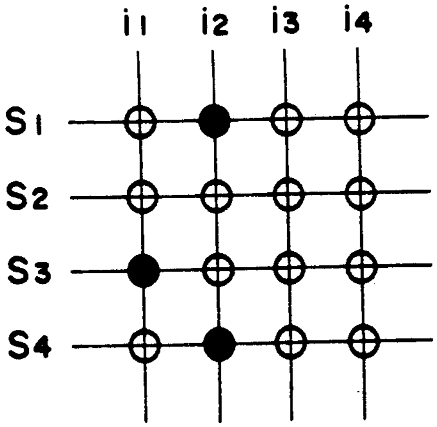
FIG. 3 is a schematic view showing a display pattern on a liquid crystal device.
Figure 2A:
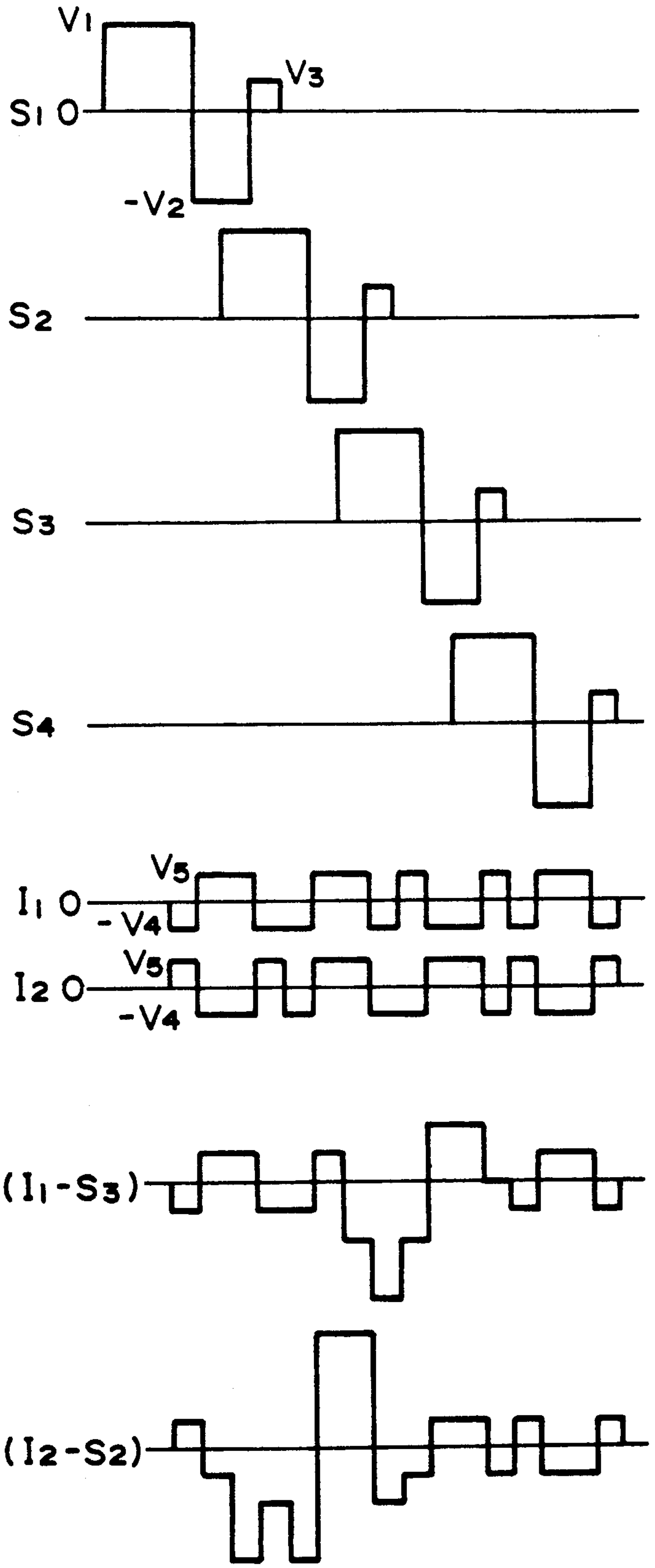
FIGS. 2A, 2B, and 2C are time charts each showing time-serial waveforms based on unit drive signals shown in FIG. 1.
Figure 2B:
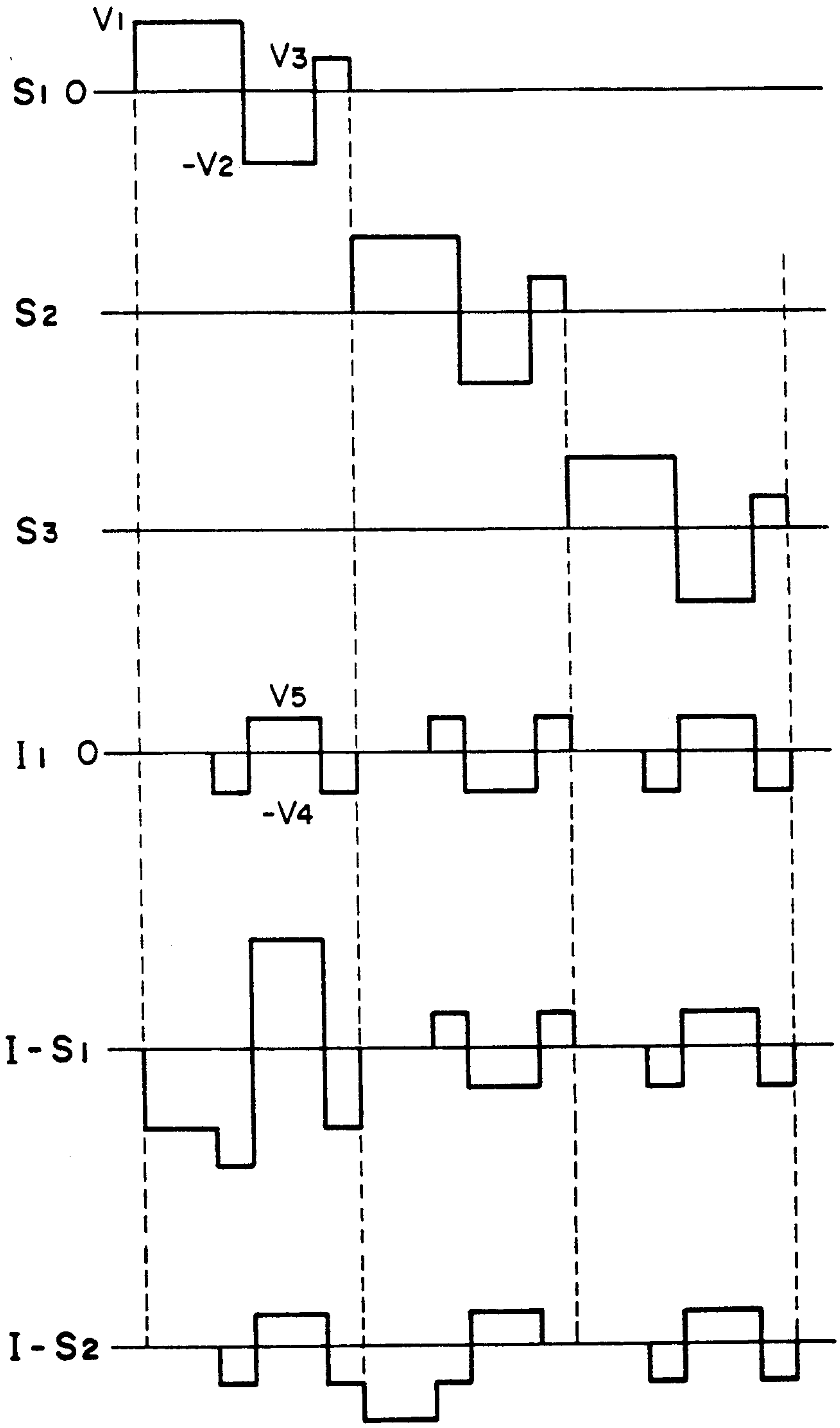
Figure 2C:
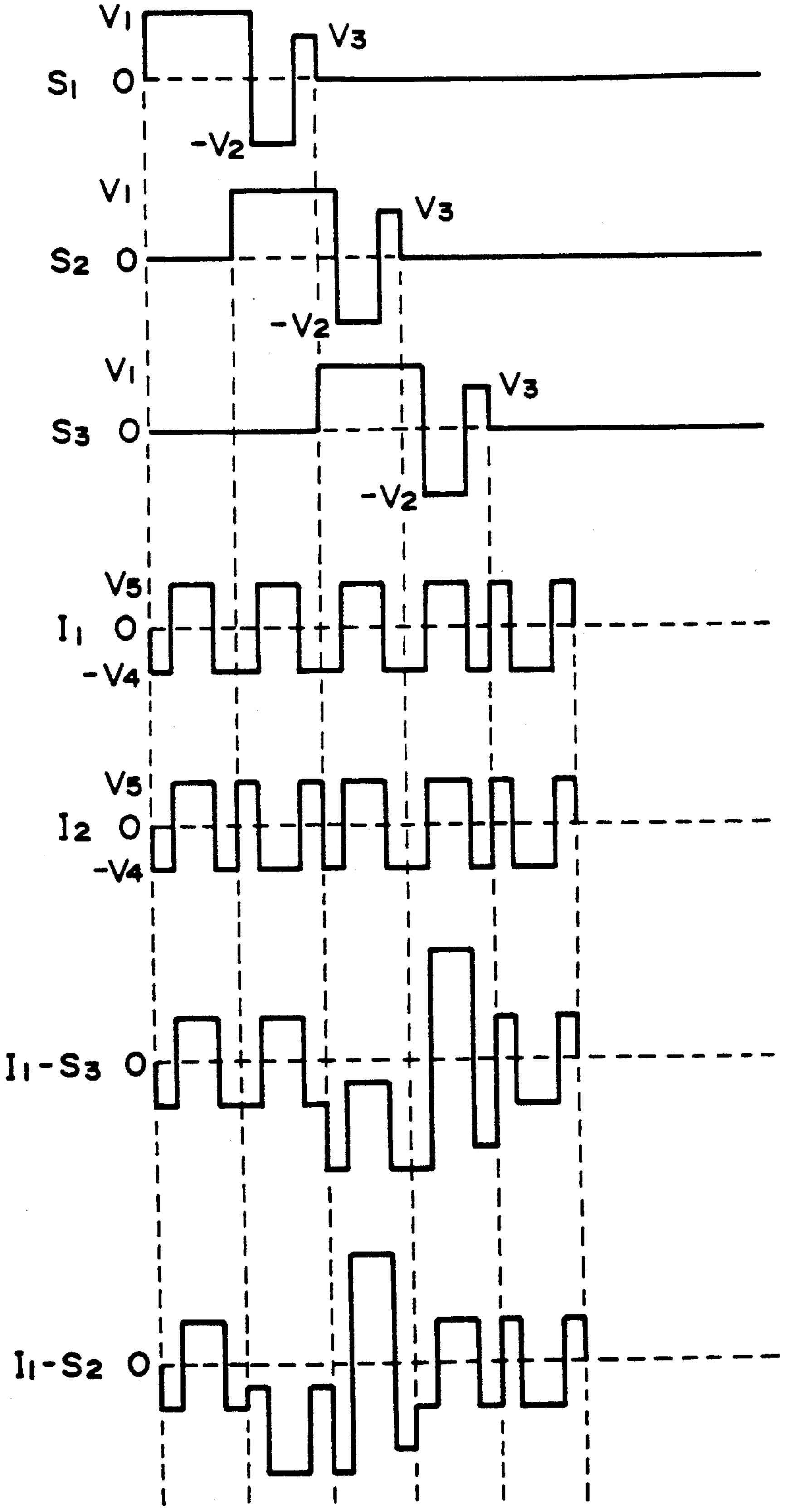

FIGS. 2A, 2B and 2C respectively show a time-serial waveform for providing a display as shown in FIG. 3 based on unit drive signals shown in FIG. 1.

Referring to each of FIGS. 2A to 2C, at $S_1$–$S_4$ are shown scanning signal waveforms applied to scanning lines $s_1$–$s_4$ in FIG. 3, at $I_1$ and $I_2$ are shown data signal waveforms applied to data lines $i_1$ and $i_2$, and at $(I_1-S_3)$ and $(I_2-S_2)$ are shown a combined waveform of the data signal waveform $I_1$ and scanning signal waveform $S_3$ and a combined waveform of the data signal waveform $I_2$ and scanning signal waveform $S_2$, respectively. The sequence shown in FIG. 2A is preferred so that a lower frame frequency can be set. FIG. 2C shows another preferred set of waveforms wherein the voltage amplitudes are, e.g., set to satisfy the relations of $|V_1''=|-V_2|=3/2.|V_3|=3/2.|-V_4|=3/2.|V_5|$.

Figure 4:
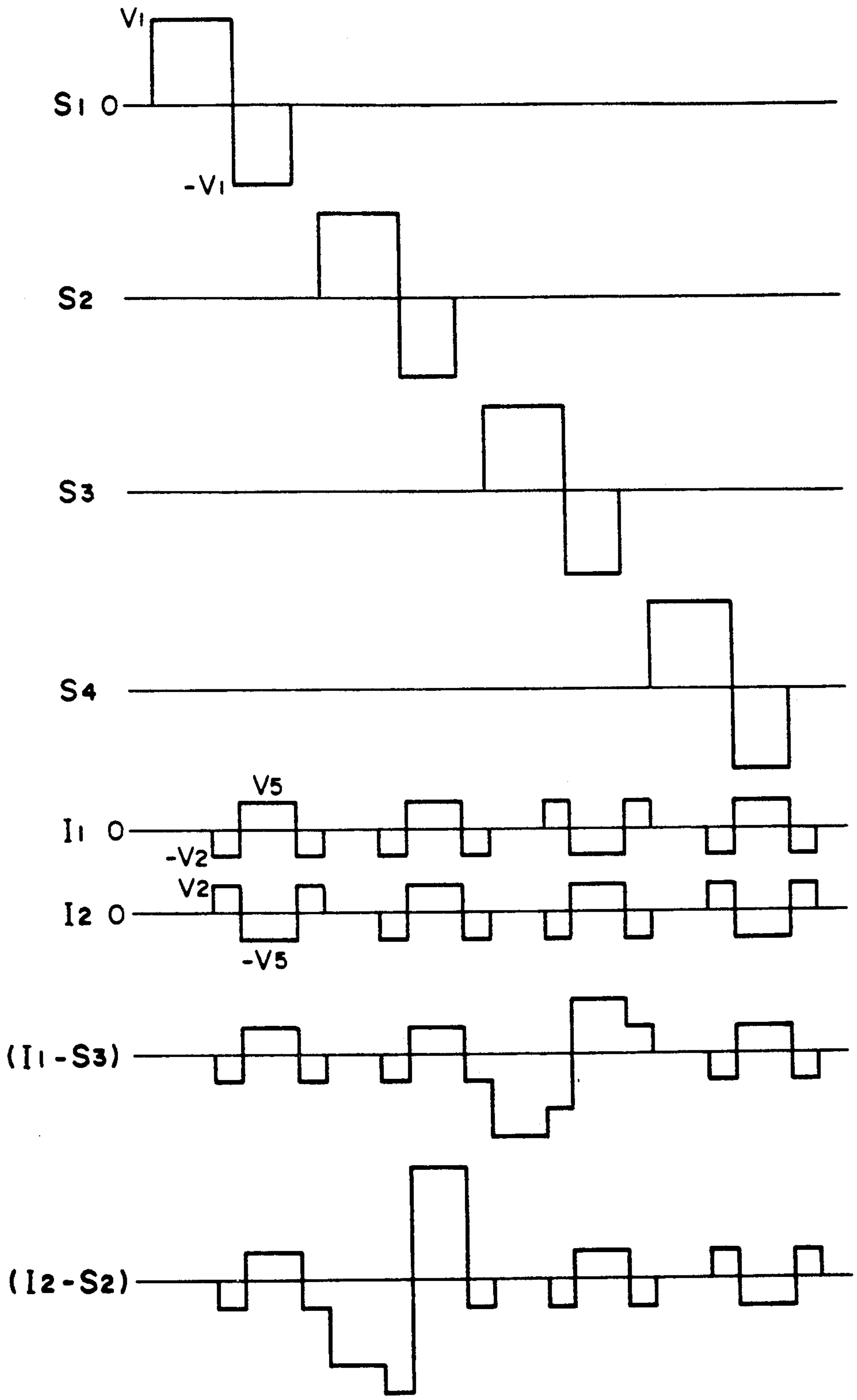
FIG. 4 PRIOR ART
FIGS. 4 and 5 are time charts each showing time-serial waveforms based on drive signals used in conventional methods.

A specific embodiment driven at a duty factor of 1/400 at room temperature provided an increased frame frequency of 1.3 times and an increased drive margin by about 10% compared with a conventional drive embodiment shown in FIG. 4. Further, compared with a conventional drive embodiment shown in FIG. 5, an increased drive margin by about 50% was attained.

In the embodiment shown in FIG. 1, it is preferred that the scanning signal (scanning selection signal) shown at FIG. 1(*a*) have pulse durations $t_1$, $t_2$ and $t_3$ satisfying $t_1$:$t_2$:$t_3$ = 3 or more:2 or more:1, preferably 5–3:3–2:1, and peak values $V_1$ and $V_2$ satisfying $|V_1|=|V_2|>2|V_3|$, preferably $|V_1|=|V_2|=2|V_3|$ to $4|V_3|$.

Figure 5:
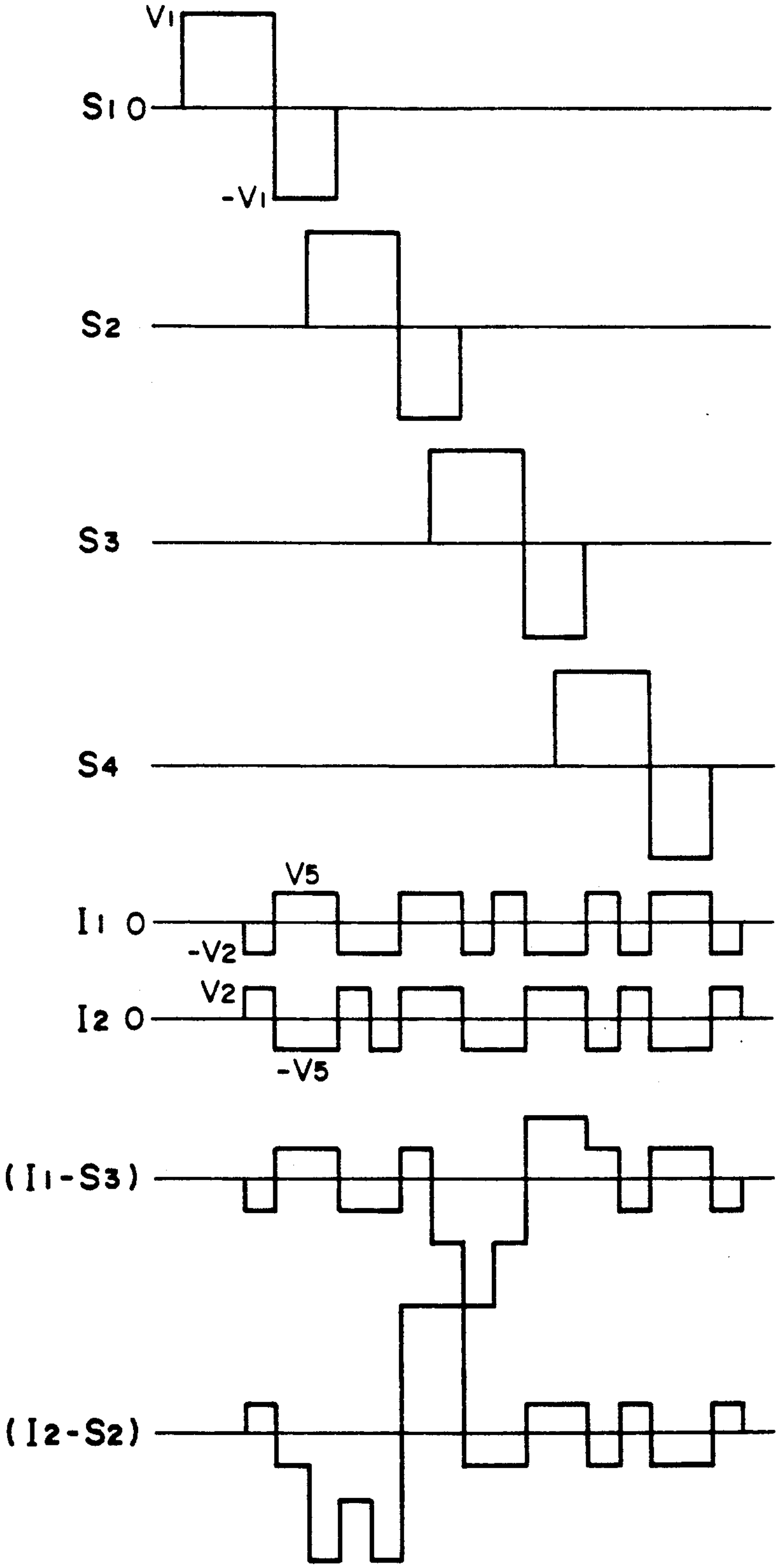
FIG. 5 PRIOR ART

FIGS. 4 and 5 respectively show time-serial waveforms used in a driving embodiment outside the present invention, in which at $S_1$–$S_4$ are shown scanning signals applied to scanning lines $s_1$–$s_4$, at $I_1$ and $I_2$ are shown data signals applied to data lines $i_1$ and $i_2$, and at $(I_1-S_3)$ and $(I_2-S_2)$ are shown combinations of $I_1$ and $S_3$ and $I_2$ and $S_2$, respectively, for providing a display pattern as shown in FIG. 3. The drive waveforms are used in a type of driving method wherein all the pixels on a selected scanning line are once written in "black" and then retained in "black" or written in "white" selectively depending on given data. The drive waveforms are designed so as to alleviate "flickering" at the time of matrix drive, but the waveforms shown in FIG. 4 are accompanied with a low frame frequency, and the waveforms shown in FIG. 5 are accompanied with a small drive margin.

Figure 6:
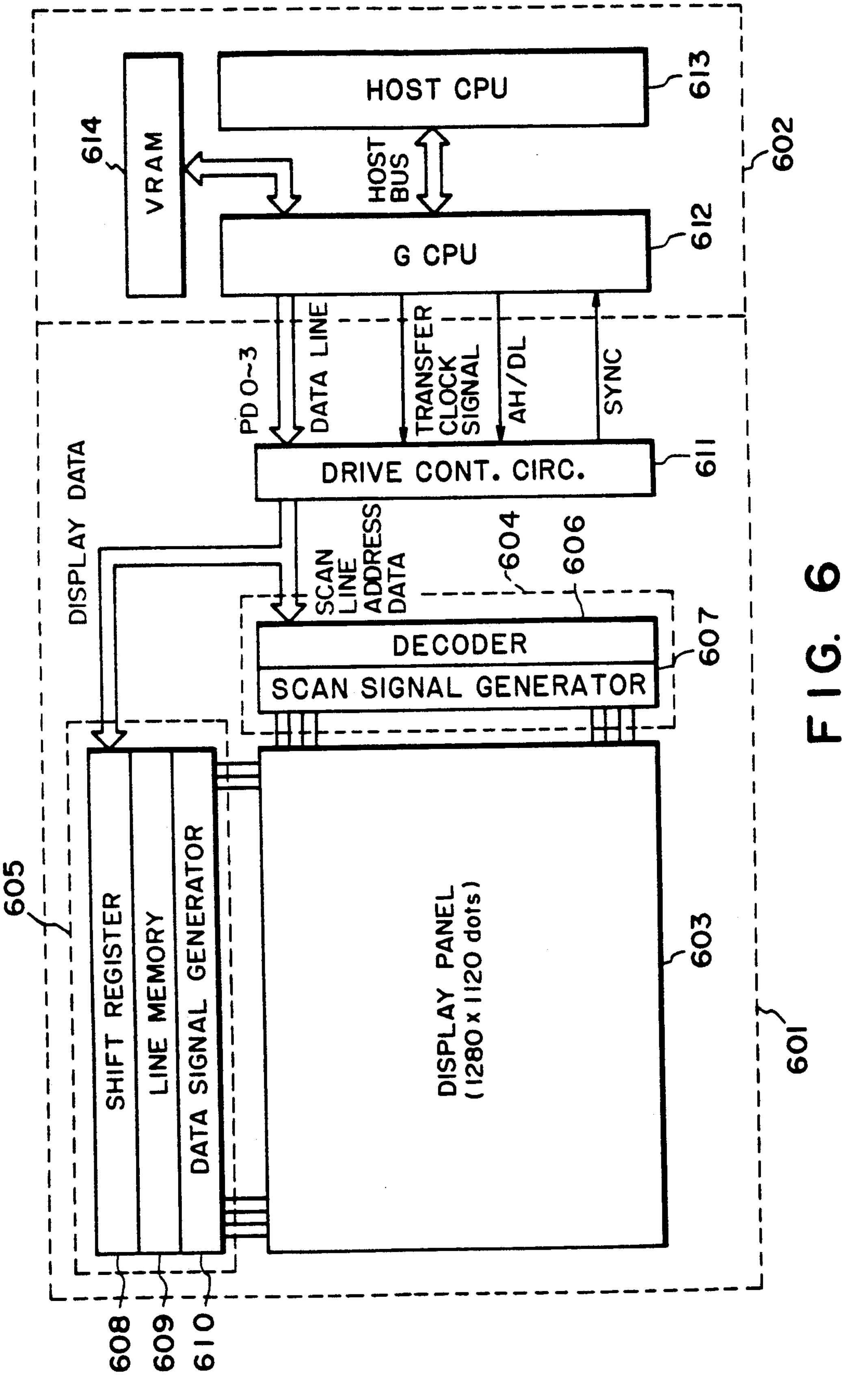
FIG. 6 is a block diagram of a liquid crystal display apparatus and a graphic controller.
Figure 7:
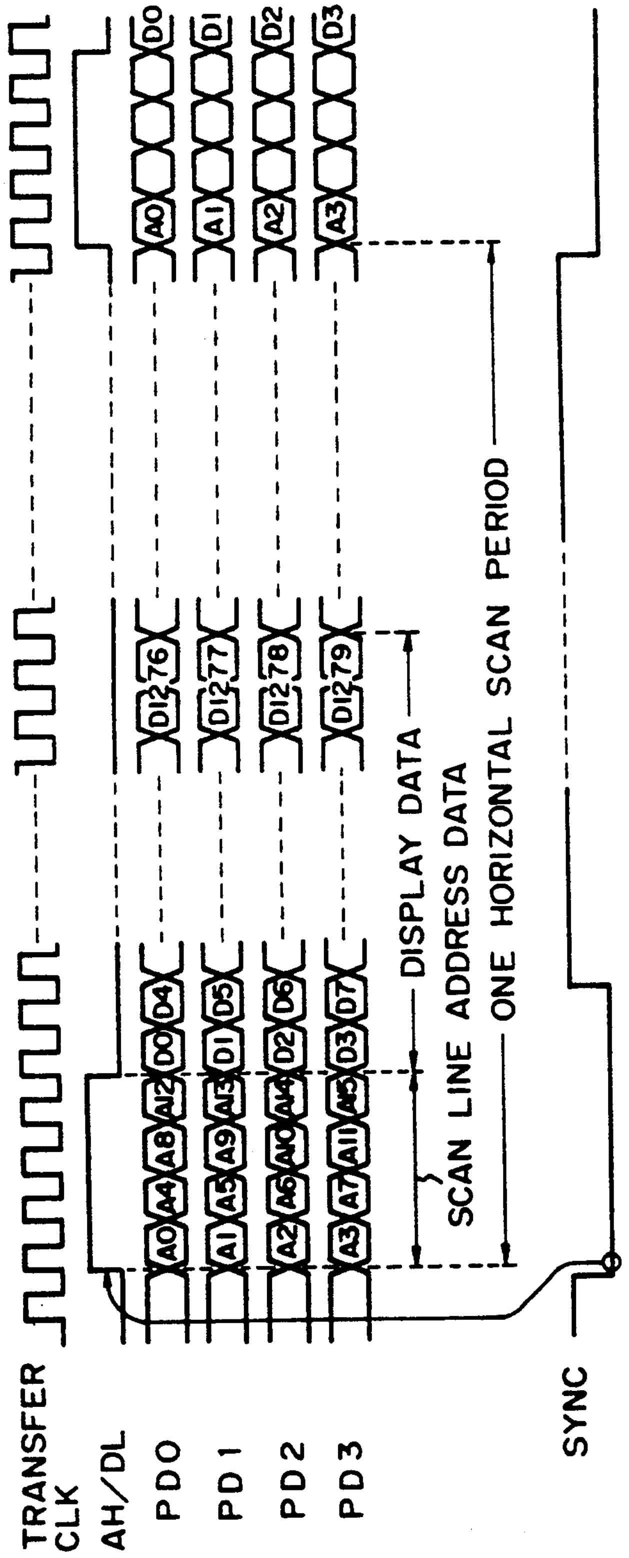
FIG. 7 is a time chart showing time correlation for image data communication between the liquid crystal display apparatus and the graphic controller.

FIG. 6 is a block diagram showing an arrangement of a ferroelectric liquid crystal display apparatus 601 and a graphic controller 602 provided in an apparatus body of, e.g., a personal computer as a source of supplying display data. FIG. 7 is a time chart for communication of image data.

A display panel 603 comprises a matrix electrode structure composed of 1120 scanning electrodes and 1280 data electrodes respectively disposed on a pair of glass plates and subjected to an aligning treatment, and a ferroelectric liquid crystal disposed between the glass substrates. The scanning electrodes (lines) and data electrodes (lines) are connected to a scanning line drive circuit 604 and a data line drive circuit 605, respectively.

Hereinbelow, the operation will be explained with reference to the figures. The graphic controller 602 supplies scanning line address data for designating a scanning line and image data (PD0–PD3) on the scanning line designated by the address data to a display drive circuit 604/605 (composed of a scanning line drive circuit 604 and a data line drive circuit 605) of the liquid crystal display apparatus 601. In this embodiment, the image data comprising the scanning line address data and the display data are transferred through the same transmission line, so that it is necessary to differentiate the above-mentioned two types of data. For the differentiation, a signal AH/DL is used. The AH/DL signal at a high level means scanning line address data, and the AH/DL signal at a low level means display data.

In the liquid crystal display apparatus 601, the scanning line address data are extracted from transferred image data PD0–PD3 by a drive control circuit 611 and then supplied to the scanning line drive circuit 604 in synchronism with a time for driving a designated scanning line. The scanning line address data are inputted to a decoder 606 in the scanning line drive circuit 604, and a designated scanning line in the display panel 603 is driven by a scanning signal generating circuit 607 with the aid of the decoder 606. On the other hand, the display data are introduced to a shift register 608 in the data line drive circuit 605 and shifted by a unit of 4 pixel data based on a transfer clock signal. When the shift of display data for one horizontal scanning line is completed by the shift register 608, the display data for 1280 pixels are transferred to a line memory disposed in parallel, memorized for a period of one horizontal scanning and are supplied to the respective data lines as display data signals through a data signal generating circuit 610.

Further, in this embodiment, the drive of the display panel 603 in the liquid crystal display apparatus 601 is not synchronized with the generation of the scanning line address data and display data in the graphic controller 602, so that it is necessary to synchronize the apparatus 601 and 602 at the time of image data transfer. A signal SYNC is in charge of the synchronization and is generated in the drive control circuit 611 in the liquid crystal display apparatus 601 at each one horizontal scanning period. The graphic controller 602 always monitors the SYNC signal, and transfers image data when the SYNC signal is at a low level and does not effect transfer after completing transfer of image data for one horizontal scanning line when the SYNC signal is at a high level. More specifically, referring to FIG. 7, the graphic controller 602 immediately sets the AH/DL signal at high level and starts transfer of image data for one horizontal scanning line when it detects that the SYNC signal is at low level. The drive control circuit 611 in the liquid crystal display apparatus 601 set to the SYNC signal at high level during the image data transfer period. When the writing in the display panel 603 is completed after a prescribed one horizontal scanning period, the drive controller circuit (FLCD controller) 611 returns the SYNC signal to the low level so that it can receive image data for a subsequent scanning line.

As an example of a ferroelectric liquid crystal, a mixture of ester compounds and pyrimidine compounds showing the following phase transition series may be used in the present invention.

$$\text{Cryst} \xrightarrow{0^\circ\text{ C.}} S_{C^*} \xrightarrow{60.1^\circ\text{ C.}} S_A \xrightarrow{70.7^\circ\text{ C.}} \text{Ch} \xrightarrow{81.4^\circ\text{ C.}} \text{Iso}$$

In the present invention, the data signal used has an auxiliary phase which alleviates flicker, etc., of an image but can increase the tendency of an unexpected inversion of a display state thereby, while the scanning signal has a pulse phase for compensating an ill effect of the pulse in the auxiliary phase of the data signal, whereby the drive margin is remarkably improved to provide room for increasing the frame frequency so that both the drive margin and the frame frequency are increased.

Figure 8:
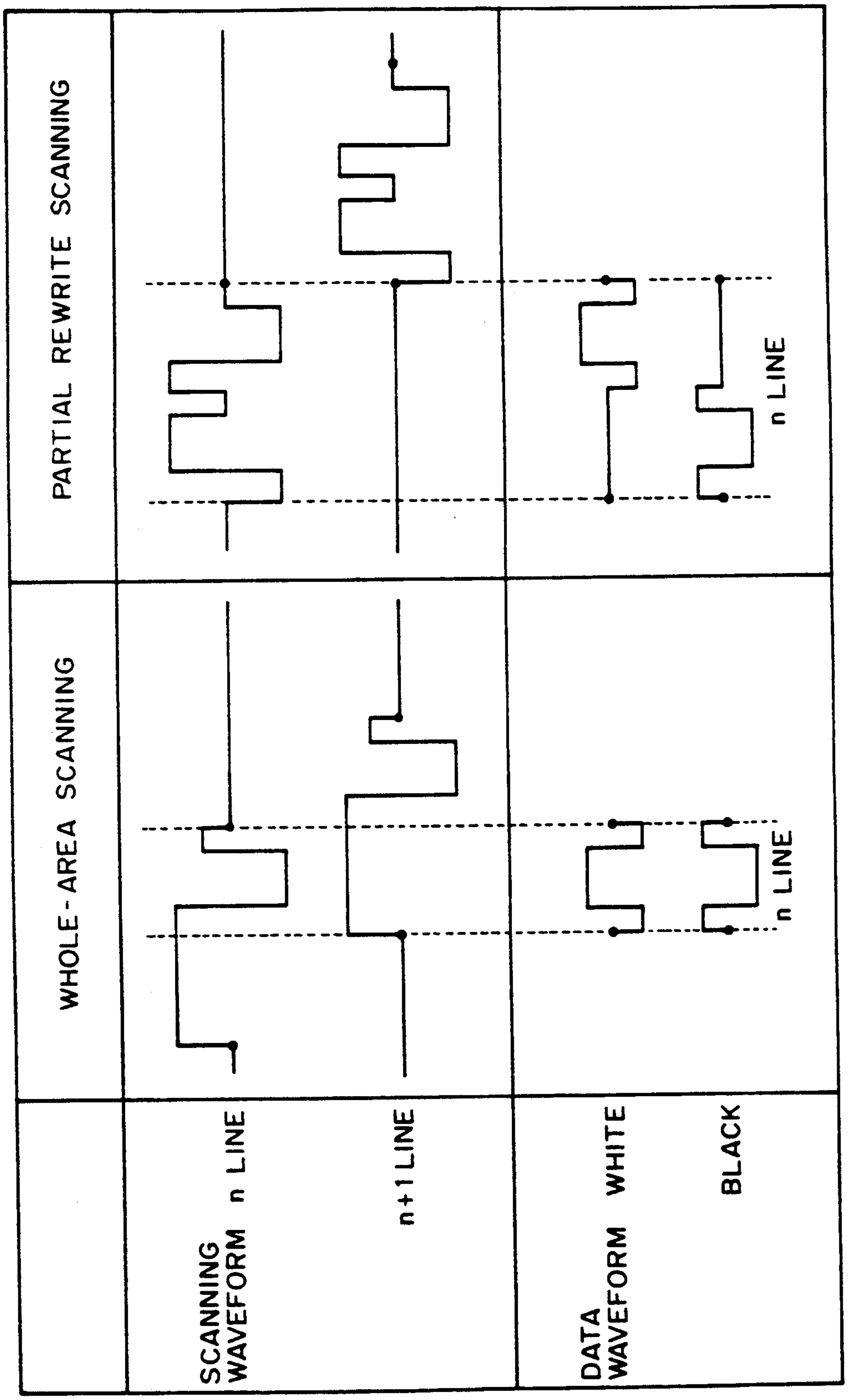
FIGS. 8 and 9 are respectively a waveform diagram showing a set of driving signal waveforms used in another embodiment of the present invention
Figure 9:
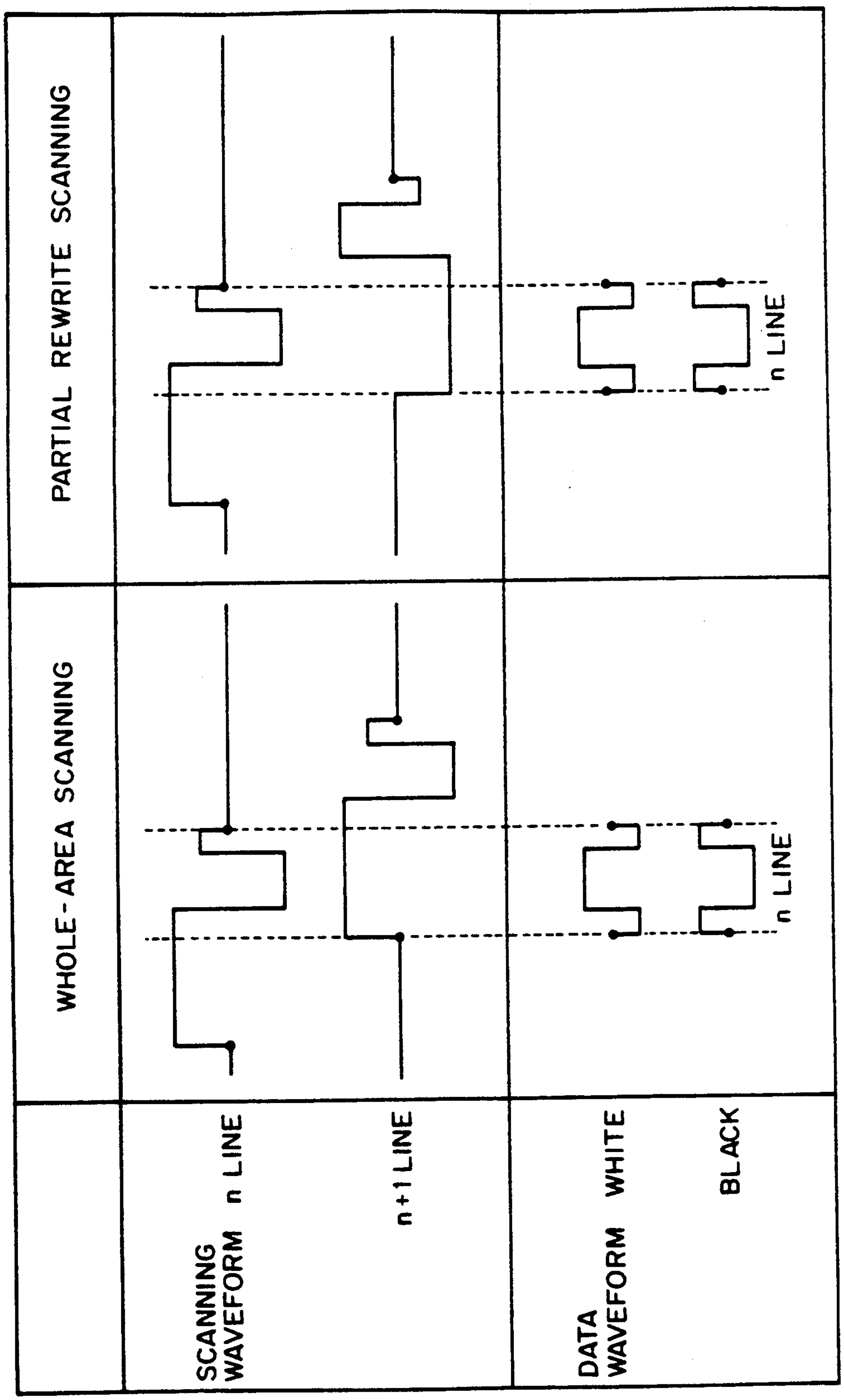

FIGS. 8 and 9 respectively show a set of driving waveforms according to an embodiment of a driving scheme for a display apparatus which is driven by both a whole-area rewrite scanning scheme with a second priority level and a partial rewrite scanning scheme with a first priority level (higher priority than the second priority level). In each of the embodiments, scanning signals having mutually different waveforms are used in the whole-area scanning and the partial rewrite scanning.

More specifically, in a drive scheme shown in FIG. 8, a scanning signal providing a black clear pulse (a pulse causing erasure into a black (dark) display state) and having a DC component is applied with some overlapping between successively applied pulses in the whole-area scanning operation. On the other hand, in the partial rewrite scanning operation, a simple scanning signal waveform containing no clear pulse or DC component is used.

In a drive scheme shown in FIG. 9, a scanning signal providing a black clear pulse and a DC component is used in the whole-area rewrite scanning operation. On the other hand, in the partial rewrite scanning operation, a scanning signal providing a black clear pulse and a scanning signal providing a white clear pulse are applied alternately, whereby DC components are canceled.

In these embodiments, the drive signals including the scanning signal used in the whole-area scanning operation are the same as those in a conventional drive scheme. In comparison with such a conventional drive scheme wherein a scanning signal providing a DC component is used in both the whole-area scanning operation and the partial rewrite scanning operation, no DC component application is involved during the partial rewrite scanning operation in these embodiments, so that the deterioration in alignment of liquid crystal is suppressed and a somewhat broader drive margin is attained. Further, by removing a black clear pulse or by using a white clear pulse for compensation, a decrease in contrast is suppressed.

In view of the fact that a decrease in threshold of pixels on a scanning electrode can occur when the scanning electrode is frequently scanned, it is possible to shorten the time width or lower the voltage amplitude of a writing pulse in the partial rewriting scanning at a certain rate compared with that in the whole-area scanning so as to realize a drive at the center of the drive margin, whereby a broader drive margin can be attained for a whole display apparatus.

As described above, by providing a scanning signal waveform with a compensation phase, an increased speed and an increased drive margin are attained to provide remarkably improved driving characteristics.

Further, by using a drive scheme wherein different drive conditions including drive waveforms are used for different scanning modes, such as a whole-area scanning operation and a partial rewrite scanning operation, it becomes possible to suppress a decrease in drive margin, a deterioration in alignment state of a liquid crystal and a decrease in contrast during the partial rewrite scanning operation.

What is claimed is:

1. A liquid crystal apparatus, comprising:

a ferroelectric liquid crystal device having an electrode matrix including a plurality of scanning lines and a plurality of data lines intersecting with said scanning lines, and a ferroelectric liquid crystal disposed between said scanning lines and said data lines, and drive means for sequentially applying a scanning signal to said scanning lines for selecting a particular scanning lines, and for applying data signals for pixels on the selected scanning line to said data lines, wherein each of the data signals has a plurality of pulses including a pulse in a control phase and a pulse in an auxiliary phase, and the scanning signal comprises at least three pulses of alternating polarities with respect to a voltage level of a non-selected scanning line, a first pulse and a third pulse of the at least three pulses of the scanning signal are of the same polarity, and the third pulse constitutes a compensation pulse for compensating for the pulse in the auxiliary phase of a data signal for a pixel on the selected scanning line so that a clearing phase of the scanning signal sufficient to simultaneously erase all pixels on a scanning line is applied to all the pixels on the selected scanning line prior to the control phase pulse of the data signals for the pixels on the selected scanning line and after the commencement of application of a pulse in the control phase of data signals for pixels on a scanning line to which a scanning signal is applied immediately prior to application of the scanning signal applied to the selected scanning line.

2. An apparatus according to claim 1, wherein the pulse in the control phase and the pulse in the auxiliary phase of a data signal have mutually opposite polarities with respect to the voltage level of a non-selected scanning line.

3. An apparatus according to claim 1, wherein the auxiliary phase is disposed before and after the control phase, and the auxiliary phase has a duration which is one half that of the control phase.

4. An apparatus according to claim 1, wherein the pixels supplied with the clearing phase of the scanning signal are erased into a black state.

5. An apparatus according to claim 1, wherein the period of the clearing phase of the scanning signal for all the pixels on the selected scanning line overlaps the period of the application of the pulse in the control phase of the data signals for the pixels on the scanning line to which a scanning signal is applied immediately prior to the application of the scanning signal applied to the selected scanning line.

6. A liquid crystal apparatus, comprising:

a ferroelectric liquid crystal device having an electrode matrix including a plurality of scanning lines and a plurality of data lines intersecting with said scanning lines, and a ferroelectric liquid crystal disposed between said scanning lines and said data lines, and drive means for sequentially applying a scanning signal to said scanning lines for selecting a particular scanning line, and for applying data signals for pixels on the selected scanning line to said data lines, wherein each of the data signals has a plurality of pulses including a pulse in a control phase and a pulse in an auxiliary phase, and the scanning signal comprising at least three pulses of alternating polarities with respect to a voltage level of a non-selected scanning line, a first pulse and a last pulse of the at least three pulses of the scanning signal being of the same polarity, and the last pulse constituting a compensation pulse for compensating for the pulse in the auxiliary phase of a data signal for a pixel on the selected scanning line, so that a clearing phase of the scanning signal sufficient to simultaneously erase all pixels on one of said scanning lines is applied to all the pixels on the selected scanning line prior to the control phase pulse of the data signals for the pixels on the selected scanning line and after the commencement of application of a pulse in the control phase of data signals for pixels on another scanning line to which a scanning signal is applied immediately prior to application of the scanning signal applied to the selected scanning line.

7. An apparatus according to claim 6, wherein the pulse in the control phase and the pulse in the auxiliary phase of a data signal have mutually opposite polarities with respect to the voltage level of a non-selected scanning line.

8. An apparatus according to claim 6, wherein the auxiliary phase is disposed before and after the control phase, and the auxiliary phase has a duration which is one half that of the control phase.

9. An apparatus according to claim 6, wherein the pixels supplied with the clearing phase of the scanning signal are erased into a black state.

10. An apparatus according to claim 6, wherein the period of the clearing phase of the scanning signal for all the pixels on the selected scanning line overlaps the period of the application of the pulse in the control phase of the data signals for the pixels on the scanning line to which a scanning signal is applied immediately prior to the application of the scanning signal applied to the selected scanning line.

11. A liquid crystal apparatus, comprising:

a ferroelectric liquid crystal device having an electrode matrix including a plurality of scanning lines and a plurality of data lines intersecting with said scanning lines, and a ferroelectric liquid crystal disposed between said scanning lines and said data lines, and drive means for sequentially applying a scanning signal to said scanning lines for selecting a particular scanning line, and for applying data signals for pixels on the selected scanning line to said data lines, wherein each of the data signals has a plurality of pulses including a pulse in a control phase and a pulse in an auxiliary phase, and the scanning signal comprises at least three pulses of alternating polarities with respect to a voltage level of a non-selected scanning line, a first pulse and a third pulse of the at least three pulses of the scanning signal are of the same polarity, and the third pulse constitutes a compensation pulse for compensating for the pulse in the auxiliary phase of a data signal for a pixel on the selected scanning line, so that a clearing phase of the scanning signal sufficient to simultaneously erase all pixels on a scanning line is applied to all the pixels on the selected scanning line prior to the control phase pulse of the data signals for the pixels on the selected scanning line and before the termination of application of a pulse in the control phase of data signals for pixels on a scanning line to which a scanning signal is applied immediately prior to application of the scanning signal applied to the selected scanning line.

12. An apparatus according to claim 11, wherein the pulse in the control phase and the pulse in the auxiliary phase of a data signal have mutually opposite polarities with respect to the voltage level of a non-selected scanning line.

13. An apparatus according to claim 11, wherein the auxiliary phase is disposed before and after the control phase, and the auxiliary phase has a duration which is one half that of the control phase.

14. An apparatus according to claim 11, wherein the pixels supplied with the clearing phase of the scanning signal are erased into a black state.

15. An apparatus according to claim 11, wherein the period of the clearing phase of the scanning signal for all the pixels on the selected scanning line overlaps the period of the application of the pulse in the control phase of the data signals for the pixels on the scanning line to which a scanning signal is applied immediately prior to the application of the scanning signal applied to the selected scanning line.

16. A liquid crystal apparatus, comprising:

A ferroelectric liquid crystal device having an electrode matrix including a plurality of scanning lines and a plurality of data lines intersecting with said scanning lines, and a ferroelectric liquid crystal disposed between said scanning lines and said data lines, and drive means for sequentially applying a scanning signal to said scanning lines for selecting a particular scanning line, and for applying data signals for pixels on the selected scanning line to said data lines, wherein each of the data signals has a plurality of pulses including a pulse in a control phase and a pulse in an auxiliary phase, and the scanning signals comprising at least three pulses of alternating polarities with respect to a voltage level of a non-selected scanning line, a first pulse and a last pulse of the at least three pulses of the scanning signal being of the same polarity, and the last pulse constituting a compensation pulse for compensating for the pulse in the auxiliary phase of a data signal for a pixel on the selected scanning line, so that a clearing phase of the scanning signal sufficient to simultaneously erase all pixels on one of said scanning lines is applied to all the pixels on the selected scanning line prior to the control phase pulse of the data signals for the pixels on the selected scanning line and before the termination of application of a pulse in the control phase of data signals for pixels on another scanning line to which a scanning signal is applied immediately prior to application of the scanning signal applied to the selected scanning line.

17. An apparatus according to claim 16, wherein the pulse in the control phase and the pulse in the auxiliary phase of a data signal have mutually opposite polarities with respect to the voltage level of a non-selected scanning line.

18. An apparatus according to claim 16, wherein the auxiliary phase is disposed before and after the control phase, and the auxiliary phase has a duration which is one half that of the control phase.

19. An apparatus according to claim 16, wherein the pixels supplied with the clearing phase of the scanning signal are erased into a black state.

20. An apparatus according to claim 16, wherein the period of the clearing phase of the scanning signal for all the pixels on the selected scanning line overlaps the period of the application of the pulse in the control phase of the data signals for the pixels on the scanning line to which a scanning signal is applied immediately prior to the application of the scanning signal applied to the selected scanning line.

21. A liquid crystal apparatus, comprising:

a ferroelectric liquid crystal device having an electrode matrix including a plurality of scanning lines and a plurality of data lines intersecting with said scanning lines, and a ferroelectric liquid crystal disposed between said scanning lines and said data lines, and drive means for sequentially applying a scanning signal to said scanning lines for selecting a particular scanning line, and for applying data signals for pixels on the selected scanning line to said data lines, wherein each of the data signals has a plurality of pulses including a pulse in a control phase and a pulse in an auxiliary phase, and the scanning signal comprises at least three pulses of alternating polarities with respect to a voltage level of a non-selected scanning line, a first pulse and a third pulse of the at least three pulses of the scanning signal are of the same polarity, and the third pulse constitutes a compensation pulse for compensating for the pulse in the auxiliary phase of a data signal for a pixel on the selected scanning line, so that a clearing phase of the scanning signal sufficient to simultaneously erase all pixels on a scanning line is applied to all the pixels on the selected scanning the prior to the control phase pulse of the data signals for the pixels on the selected scanning line and before the commencement of application of a pulse in the control phase of data signals for pixels on a scanning line to which a scanning signal is applied immediately prior to application of the scanning signal applied to the selected scanning line.

22. An apparatus according to claim 21, wherein the pulse in the control phase and the pulse in the auxiliary phase of a data signal have mutually opposite polarities with respect to the voltage level of a non-selected scanning line.

23. An apparatus according to claim 21, wherein the auxiliary phase is disposed before and after the control phase, and the auxiliary phase has a duration which is one half that of the control phase.

24. An apparatus according to claim 21, wherein the pixels supplied with the clearing phase of the scanning signal are erased into a black state.

25. An apparatus according to claim 21, wherein the period of the clearing phase of the scanning signal for all the pixels on the selected scanning line overlaps the period of the application of the pulse in the control phase of the data signals for the pixels on the scanning line to which a scanning signal is applied immediately prior to the application of the scanning signal applied to the selected scanning line.

26. A liquid crystal apparatus, comprising:

a ferroelectric liquid crystal device having an electrode matrix including a plurality of scanning lines and a plurality of data lines intersecting with said scanning lines, and a ferroelectric liquid crystal disposed between said scanning lines and said data lines, and drive means for sequentially applying a scanning signal to said scanning lines for selecting a particular scanning line, and for applying data signals for pixels on the selected scanning line to said data lines, wherein each of the data signals has a plurality of pulses including a pulse in a control phase and a pulse in an auxiliary phase, and the scanning signal comprising at least three pulses of alternating polarities with respect to a voltage level of a non-selected scanning line, a first pulse and a last pulse of the at least three pulses of the scanning signal being of the same polarity, and the last pulse constituting a compensation pulse for compensating for the pulse int he auxiliary phase of a data signal for a pixel on the selected scanning line, so that a clearing phase of the scanning signal sufficient to simultaneously erase all pixels on one of said scanning lines is applied to all the pixels on the selected scanning line prior to the control phase pulse of the data signals for the pixels on the selected scanning line and before the commencement of application of a pulse in the control phase of data signals for pixels on another scanning line to which a scanning signal is applied immediately prior to application of the scanning signal applied to the selected scanning line.

27. An apparatus according to claim 26, wherein the pulse in the control phase and the pulse in the auxiliary phase of a data signal have mutually opposite polarities with respect to the voltage level of a non-selected scanning line.

28. An apparatus according to claim 26, wherein the auxiliary phase is disposed before and after the control phase, and the auxiliary phase has a duration which is one half that of the control phase.

29. An apparatus according to claim 26, wherein the pixels supplied with the clearing phase of the scanning signal are erased into a black state.

30. An apparatus according to claim 26, wherein the period of the clearing phase of the scanning signal for all the pixels on the selected scanning line overlaps the period of the application of the pulse in the control phase of the data signals for the pixels on the scanning line to which a scanning signal is applied immediately prior to the application of the scanning signal applied to the selected scanning line.

31. A display apparatus, comprising:

(a) a display panel comprising an electrode matrix formed by scanning electrodes and data electrodes, (b) selection means for selectively subjecting the scanning electrodes to a whole-area rewrite scanning operation or a partial rewrite scanning operation, and (c) pulse generating means for generating a scanning pulse for the whole-area scanning operation and a scanning pulse for the partial rewrite scanning operation, said scanning pulse for the whole-area scanning operation and said scanning pulse for the partial rewrite scanning operation having mutually different waveforms.

32. A display apparatus according to claim 31, wherein said display panel comprises a ferroelectric liquid crystal in combination with the electrode matrix.

* * * * *

UNITED STATES PATENT AND TRADEMARK OFFICE

CERTIFICATE OF CORRECTION

PATENT NO. : 5,267,065

DATED : November 30, 1993

INVENTOR(S) : Osamu Taniguchi, et al.

It is certified that error appears in the above-indentified patent and that said Letters Patent is hereby corrected as shown below:

COLUMN 3

Line 22, "$|V_1$"=" should read --$|V_1| =$ --.

COLUMN 6

Line 27, "lines," should read --line,--.
Line 40, "line" should read --line,--.

COLUMN 8

Line 43, "A" should read --a--.
Line 56, "signals" should read --signal--.

COLUMN 10

Line 35, "int he" should read --in the--.

Signed and Sealed this

Ninth Day of August, 1994

Attest:

BRUCE LEHMAN

*Attesting Officer*

*Commissioner of Patents and Trademarks*